(12) United States Patent
Kunick et al.

(10) Patent No.: US 10,368,002 B2
(45) Date of Patent: Jul. 30, 2019

(54) CAMERA MODULES WITH AUTOFOCUS AND OPTICAL IMAGE STABILIZATION FUNCTIONS

(71) Applicant: CORNING INCORPORATED, Corning, NY (US)

(72) Inventors: Joseph Marshall Kunick, Victor, NY (US); Karan Mehrotra, Painted Post, NY (US); Mark J Soulliere, Corning, NY (US); Paul Michael Then, Victor, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/256,619

(22) Filed: Jan. 24, 2019

(65) Prior Publication Data

US 2019/0158749 A1 May 23, 2019

Related U.S. Application Data

(63) Continuation of application No. PCT/US2018/021718, filed on Mar. 9, 2018.

(Continued)

(51) Int. Cl.
*H04N 5/232* (2006.01)
*H04N 5/225* (2006.01)
(Continued)

(52) U.S. Cl.
CPC ........... *H04N 5/23287* (2013.01); *G02B 3/14* (2013.01); *G02B 7/08* (2013.01); *G02B 7/09* (2013.01);
(Continued)

(58) Field of Classification Search
CPC ............ H04N 5/23287; H04N 5/2254; H04N 5/2253; H04N 5/23212; G02B 7/09; G02B 27/646; G02B 3/14
See application file for complete search history.

(56) References Cited

U.S. PATENT DOCUMENTS 6,332,060 B1 12/2001 Miyamoto et al.
7,307,653 B2 12/2007 Dutta
(Continued)

OTHER PUBLICATIONS

Android Central "OPPO's Smartsensor Wants to Change the Way Smartphones Stabilize Images"; (2016) 9 Pages; http://www.androidcentral.com/oppos-smartsensor-wants-change-way-smartphones-stabilize-images.
(Continued)

*Primary Examiner* — Padma Haliyur

(57) ABSTRACT

A camera module includes an image sensor, a lens assembly, and a mechanical actuator. The lens assembly is positioned to focus an image on the image sensor and includes a variable focus lens. The mechanical actuator causes relative translation between the lens assembly and the image sensor in each of an X-direction parallel to a first lateral axis and a Y-direction parallel to a second lateral axis. The first lateral axis is substantially perpendicular to an optical axis of the lens assembly, and the second lateral axis substantially perpendicular to each of the optical axis and the first lateral axis. The lens assembly is fixed relative to the image sensor in each of a first rotational direction about the first lateral axis and a second rotational direction about the second lateral axis.

30 Claims, 7 Drawing Sheets

Related U.S. Application Data

(60) Provisional application No. 62/561,443, filed on Sep. 21, 2017, provisional application No. 62/469,203, filed on Mar. 9, 2017.

(51) Int. Cl.
*G02B 7/08* (2006.01)
*G02B 3/14* (2006.01)
*G02B 27/64* (2006.01)
*G02B 7/09* (2006.01)

(52) U.S. Cl.
CPC ......... *G02B 27/646* (2013.01); *H04N 5/2253* (2013.01); *H04N 5/2254* (2013.01); *H04N 5/2257* (2013.01); *H04N 5/23212* (2013.01)

(56) References Cited

U.S. PATENT DOCUMENTS

| | | | |
|---|---|---|---|
| 7,443,596 B1 | 10/2008 | Berge | |
| 7,548,377 B2 | 6/2009 | Berge | |
| 7,573,646 B2 | 8/2009 | Craen et al. | |
| 7,616,737 B2 | 11/2009 | Kuiper et al. | |
| 7,627,236 B2 | 12/2009 | Ojala | |
| 7,649,692 B2 | 1/2010 | Berge | |
| 7,808,717 B2 | 10/2010 | Kuiper et al. | |
| 8,261,029 B1 | 9/2012 | Craen et al. | |
| 8,325,265 B2 | 12/2012 | Chen | |
| 8,400,558 B2 | 3/2013 | Berge et al. | |
| 8,687,281 B2 | 4/2014 | Jannard et al. | |
| 8,768,157 B2 | 7/2014 | Gutierrez et al. | |
| 8,848,064 B2 | 9/2014 | Topliss et al. | |
| 8,922,901 B2 | 12/2014 | Karam et al. | |
| 9,134,503 B2 | 9/2015 | Topliss | |
| 9,172,856 B2 | 10/2015 | Bohn et al. | |
| 9,201,174 B2 | 12/2015 | Karam et al. | |
| 9,426,362 B2 | 8/2016 | Tang et al. | |
| 9,781,405 B2 | 10/2017 | Gutierrez | |
| 10,015,384 B2 | 7/2018 | Bachar et al. | |
| 2009/0231537 A1 | 9/2009 | Yamamiya | |
| 2010/0295987 A1 | 11/2010 | Berge | |
| 2011/0211821 A1 | 9/2011 | Park et al. | |
| 2012/0307089 A1 | 12/2012 | Rukes | |
| 2013/0182136 A1 | 7/2013 | Ishizue | |
| 2014/0009631 A1 | 1/2014 | Topliss | |
| 2014/0017625 A1 | 1/2014 | Liu et al. | |
| 2014/0125825 A1* | 5/2014 | Baer | H04N 5/23277 348/208.5 |
| 2014/0307252 A1 | 10/2014 | Hinderling et al. | |
| 2015/0116591 A1 | 4/2015 | Han | |
| 2015/0201127 A1 | 7/2015 | Ahn | |
| 2015/0271386 A1 | 9/2015 | Schneider | |
| 2015/0316748 A1 | 11/2015 | Cheo et al. | |
| 2015/0373252 A1 | 12/2015 | Georgiev | |
| 2016/0028930 A1 | 1/2016 | Kim | |
| 2016/0134799 A1 | 5/2016 | Karam et al. | |
| 2016/0212332 A1 | 7/2016 | Tang et al. | |
| 2016/0219222 A1 | 7/2016 | Heo et al. | |
| 2016/0306146 A1 | 10/2016 | Kim | |
| 2016/0337592 A1 | 11/2016 | Gutierrez | |

OTHER PUBLICATIONS

Gsmarena; "OPPO at MWC 2016 Smartsensor Image Stabilization and Super VOOC"; (2016); 4 Pages; http://www.gsmarena.com/oppo_mwc_2016-review-1390.php.

Gutierrez et al; "Application of Fluidic Control Within a Plano-Convex Singlet Lens"; Dept. of Engineering, University of California; Date Unknow; 5 Pages.

Murphy et al; "Lens Drivers Focus on Performance in High-Resolution Camera Modules"; Analogdialogue; (2016) 15 Pages; http://www.analog.com/en/analog-dialogue/articles/lens-drivers-focus-in-camera-modules.html.

Optics & Laser Europe; Mar. 2006; Issue 137; The European Magazine for Photonics Professionals; 44 Pages.

Varioptic; "Liquid Lens for Auto Focus (AF)"; (2017); 3 Pages; http://www.varioptic.com/technology/liquid-lens-autofocus-af/.

Varioptic; "Liquid Lens for Optical Image Stabilization (OIS)"; 2016; 4 Pages; http://dev.varioptic.emencia.net/technology/liquid-lens-optical-image-stabilization-ois/).

International Search Report and Written Opinion of the International Searching Authority; PCT/US2018/021718; dated May 25, 2018; 14 Pages; European Patent Office.

* cited by examiner

US 10,368,002 B2

CAMERA MODULES WITH AUTOFOCUS AND OPTICAL IMAGE STABILIZATION FUNCTIONS

CROSS-REFERENCE TO RELATED APPLICATIONS

This application is a continuation of International Application No. PCT/US2018/021718, filed on Mar. 9, 2018, which claims the benefit of priority under 35 U.S.C. § 119 of U.S. Provisional Application No. 62/469,203, filed on Mar. 9, 2017, and U.S. Provisional Application No. 62/561,443, filed on Sep. 21, 2017, the contents of each of which is relied upon and incorporated herein by reference in its entirety.

BACKGROUND

Field

This disclosure relates to camera modules, and more particularly, to camera modules with autofocus and optical image stabilization (OIS) functions.

Technical Background

A camera module for a digital camera generally includes an image sensor and an optical system that is positioned to focus an image on the image sensor. Some more advanced camera modules perform an autofocus function and/or an optical image stabilization (OIS) function. For example, a camera module that is configured to perform both autofocus and OIS functions can include three voice coil motors (VCMs) that physically translate the optical system in three different axes. Such mechanical systems can require a relatively large amount of space and consume a relatively large amount of power, each of which is disadvantageous, especially for consumer electronics applications such as smartphones or tablet computers in which slim form factor and increased battery life are desirable. In addition, such mechanical systems can function relatively slowly, which leads to poor autofocus and/or OIS performance.

SUMMARY

Disclosed herein are camera modules with autofocus and optical image stabilization functions.

Disclosed herein is a camera module comprising an image sensor, a lens assembly, and a mechanical actuator. The lens assembly is positioned to focus an image on the image sensor and comprises a variable focus lens. The mechanical actuator causes relative translation between the lens assembly and the image sensor in each of an X-direction parallel to a first lateral axis and a Y-direction parallel to a second lateral axis. The first lateral axis is substantially perpendicular to an optical axis of the lens assembly, and the second lateral axis substantially perpendicular to each of the optical axis and the first lateral axis. The lens assembly is fixed relative to the image sensor in each of a first rotational direction about the first lateral axis and a second rotational direction about the second lateral axis.

Disclosed herein is a camera module comprising an image sensor, a lens assembly, and a mechanical actuator. The lens assembly is positioned to focus an image on the image sensor and comprises a variable focus lens. The mechanical actuator translates the lens assembly relative to the image sensor in an X-direction parallel to a first lateral axis and a Y-direction parallel to a second lateral axis. The first lateral axis is substantially perpendicular to an optical axis of the lens assembly, and the second lateral axis is substantially perpendicular to each of the optical axis and the first lateral axis. The lens assembly is fixed relative to the image sensor in each of a first rotational direction about the first lateral axis, a second rotational direction about the second lateral axis, and a Z-direction parallel to the optical axis. The lens assembly and the mechanical actuator cooperatively operate to perform an optical image stabilization (OIS) function in four or more axes.

Disclosed herein is a camera module comprising an image sensor, a lens assembly, and a mechanical actuator. The lens assembly is positioned to focus an image on the image sensor and comprises a variable focus lens. The mechanical actuator comprises a first actuating member that translates the lens assembly relative to the image sensor in an X-direction parallel to a first lateral axis and a second actuating member that translates the lens assembly relative to the image sensor in a Y-direction parallel to a second lateral axis. The first lateral axis is substantially perpendicular to an optical axis of the lens assembly, and the second lateral axis is substantially perpendicular to each of the optical axis and the first lateral axis. The lens assembly is fixed relative to the image sensor in each of a first rotational direction about the first lateral axis, a second rotational direction about the second lateral axis, and a Z-direction parallel to the optical axis. The lens assembly and the mechanical actuator cooperatively operate to perform an optical image stabilization (OIS) function in four or more axes.

Disclosed herein is a method for operating a camera module. The method comprises adjusting a focal length of a variable focus lens of a lens assembly to perform an autofocus function. The method comprises translating the lens assembly relative to an image sensor in each of an X-direction parallel to a first lateral axis and a Y-direction parallel to a second lateral axis in response to movement of the camera module in a first rotational direction about the first lateral axis and a second rotational direction about the second lateral axis. The first lateral axis is substantially perpendicular to an optical axis of the lens assembly, and the second lateral axis is substantially perpendicular to each of the optical axis and the first lateral axis. The lens assembly is fixed relative to the image sensor in each of the first rotational direction, the second rotational direction, and a Z-direction parallel to the optical axis.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
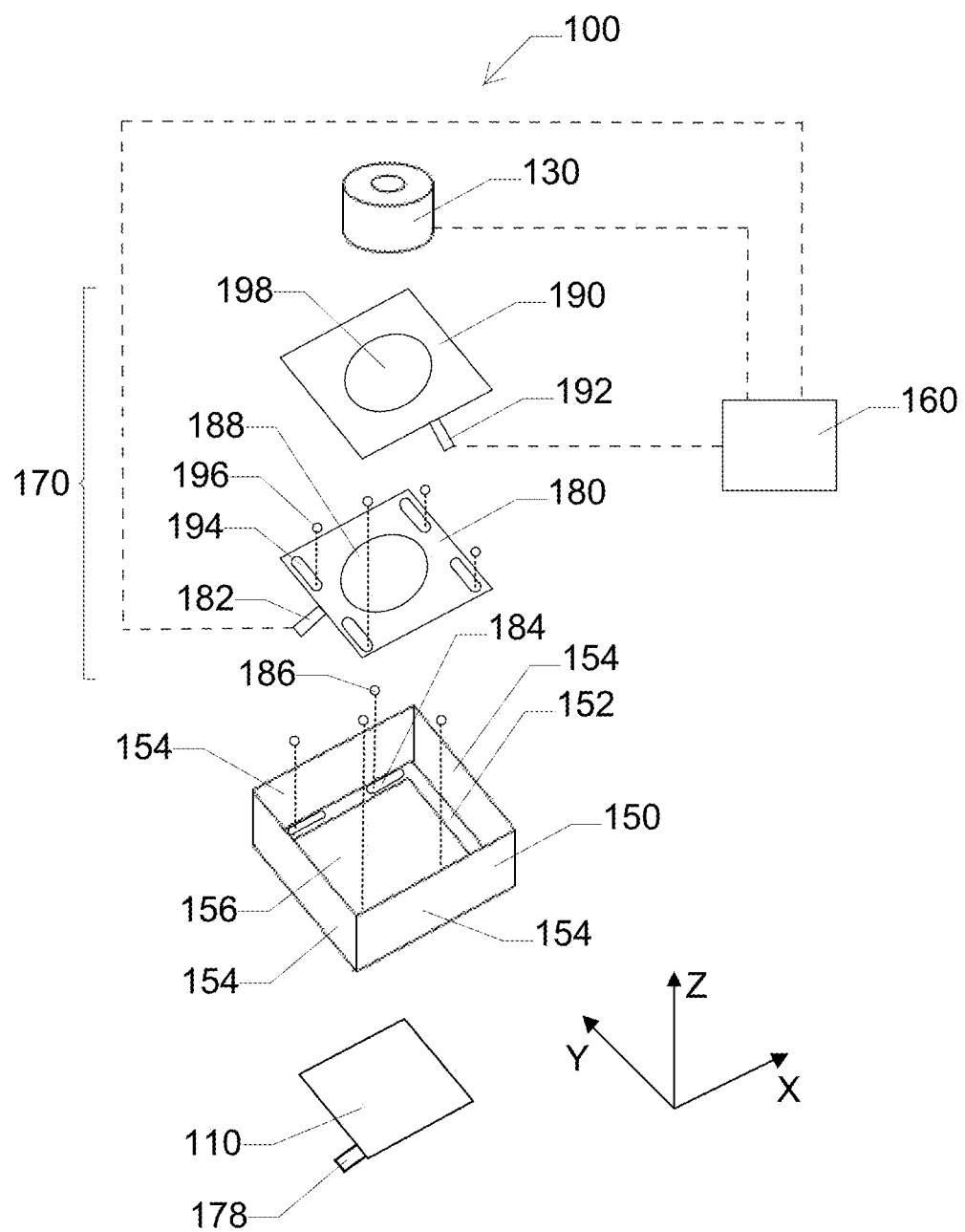
FIG. 1 is an exploded schematic view of some embodiments of a camera module.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

In various embodiments, a camera module comprises an image sensor and a lens assembly positioned to focus an image on the image sensor. The lens assembly comprises a variable focus lens. In some embodiments, a mechanical actuator causes relative translation between the lens assembly and the image sensor in each of an X-direction parallel to a first lateral axis and a Y-direction parallel to a second lateral axis. The first lateral axis is substantially perpendicular to an optical axis of the lens assembly, and the second lateral axis is substantially perpendicular to each of the optical axis and the first lateral axis. Additionally, or alternatively, the lens assembly is fixed relative to the image sensor in each of a first rotational direction about the first lateral axis and a second rotational direction about the second lateral axis. In some embodiments, the variable focus lens is adjustable to perform an autofocus function. For example, the variable focus lens is a liquid lens with a liquid interface that is adjustable to adjust a focal length of the lens assembly to perform the autofocus function. Additionally, or alternatively, the mechanical actuator causes the relative translation between the lens assembly and the image sensor to perform an optical image stabilization (OIS) function. Thus, in some embodiments, both autofocus and OIS functions can be achieved using the variable focus lens and the relatively simple two-axis mechanical actuator, as opposed to a more complex mechanical actuator that operates in three or more axes. In some embodiments, the variable focus lens is adjustable to perform the OIS function. For example, the variable focus lens is a liquid lens with a liquid interface that is adjustable to adjust a tilt of the interface to adjust a focal point of the lens assembly in at least one of the X-direction or the Y-direction. Thus, in some embodiments, the variable focus lens and the mechanical actuator can cooperatively operate to perform the OIS function in four or more axes with mechanical motion in two or fewer axes or to perform the OIS function in five or more axes with mechanical motion in three or fewer axes.

Because the variable focus lens is capable of performing the OIS function in two axes, the camera modules described herein enable sophisticated OIS functionality in four or five axes with relatively simple mechanical motion that is limited to one lateral plane (e.g., the X-Y plane). Compared to traditional camera modules that make use of mechanical translation along multiple axes (e.g., X-Y-Z motion) as well as rotation about those axes, the camera modules described herein can have reduced power consumption, increased lifetime, increased resistance to mechanical shock, faster focus/stabilizing time, improved close-up focusing, simplified OIS control, smaller form factor, and reduced electromagnetic interference (e.g., as a result of using mechanical actuators that operate without a varying magnetic field).

Figure 2:
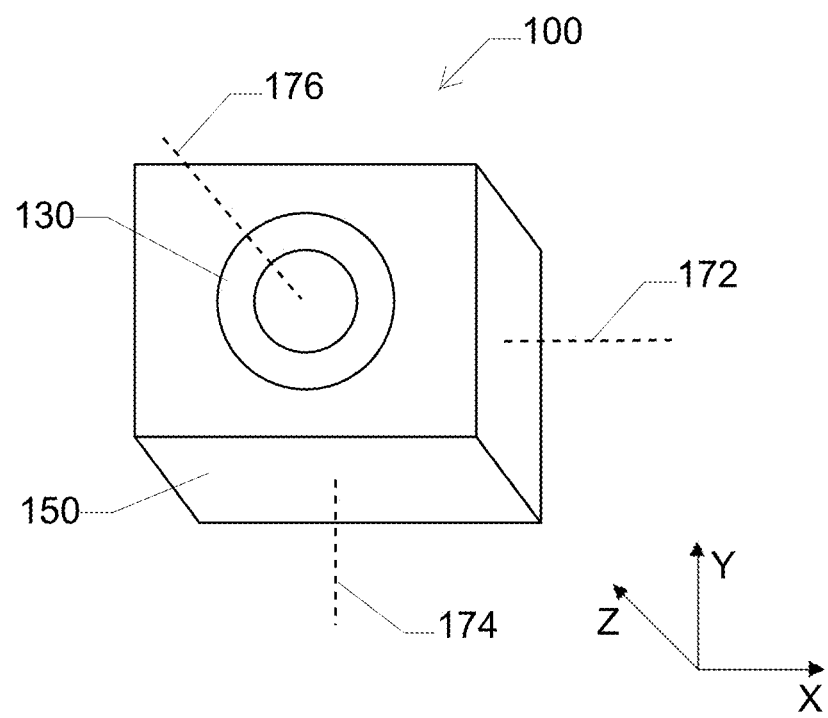
FIG. 2 is a perspective view of the camera modules shown in FIG. 1.

FIGS. 1 and 2 are an exploded schematic view and a perspective view, respectively, of some embodiments of a camera module 100 comprising an image sensor 110 and a lens assembly 130 positioned to focus an image on the image sensor. In some embodiments, camera module 100 comprises a housing 150, and lens assembly 130 is mounted within the housing to focus the image on image sensor 110. For example, housing 150 comprises a floor 152 and one or more side walls 154 extending from the floor. In some embodiments, housing 150 comprises an opening 156 in floor 152, and image sensor 110 is received within or otherwise aligned with the opening as shown in FIGS. 1 and 2. In other embodiments, image sensor 110 is mounted on the floor of the housing such that the opening can be omitted. Thus, the floor of the housing can be continuous and/or free of an opening.

Although housing 150 shown in FIGS. 1 and 2 comprises four substantially solid side walls 154 extending from floor 152 to form a perimeter enclosure, other embodiments are included in this disclosure. For example, in other embodiments, one or more of the side walls are omitted. For example, housing 150 can comprise three walls, two walls, or one wall. Additionally, or alternatively, one or more of the side walls comprise an opening (e.g., to enable electrical connections to pass therethrough).

Camera module 100 comprises a mechanical actuator 170 that causes relative translation between lens assembly 130 and image sensor 110. For example, in the embodiments shown in FIGS. 1 and 2, mechanical actuator 170 causes relative translation in each of an X-direction parallel to a first lateral axis 172 and a Y-direction parallel to a second lateral axis 174 as described herein. First lateral axis 172 is substantially perpendicular to an optical axis 176 of lens assembly 130, and second lateral axis 174 is substantially perpendicular to each of the optical axis and the first lateral axis. In some embodiments, mechanical actuator 170 comprises a first stage 180 and a second stage 190. First stage 180 is translatable relative to image sensor 110 in at least one lateral direction (e.g., the X-direction), and second stage 190 is translatable relative to the image sensor in at least one lateral direction (e.g., the Y-direction) as described herein. Translation of lens assembly 130 relative to image sensor 110 in two orthogonal directions can enable mechanical actuator 170 to perform an OIS function in two axes as described herein.

In some embodiments, first stage 180 is movably engaged with housing 150 to enable translation of the first stage relative to the housing. For example, first stage 180 is coupled to housing 150 (e.g., to floor 152 and/or side wall 154) with a first actuating member 182 that can be actuated to cause the translation of the first stage relative to the housing. In some embodiments, camera module 100 comprises a gliding mechanism disposed between first stage 180 and housing 150. For example, in the embodiments shown in FIGS. 1 and 2, the gliding mechanism comprises one or more grooves 184 formed in floor 152 of housing 150 and a bearing 186 disposed within each groove. First stage 180 rests on bearings 186, and the bearings are free to roll within grooves 184. Thus, the gliding mechanism can reduce the friction between first stage 180 and housing 150 during translation of the first stage relative to the housing. Additionally, or alternatively, the gliding mechanism can help to enable smooth translation of first stage 180 relative to housing 150 by preventing binding or jarring of the first stage during translation.

In some embodiments, second stage 190 is movably engaged with housing 150 and/or first stage 180 to enable translation of the second stage relative to the housing. For example, second stage 190 is coupled to housing 150 (e.g., to floor 152 and/or side wall 154) and/or first stage 180 with a second actuating member 192 that can be actuated to cause the translation of the second stage relative to the housing. In some embodiments, camera module 100 comprises a gliding mechanism disposed between second stage 190 and first stage 180. For example, in the embodiments shown in FIGS. 1 and 2, the gliding mechanism comprises one or more grooves 194 formed on an upper surface of first stage 180 and a bearing 196 disposed within each groove. Second stage 190 rests on bearings 196, and the bearings are free to roll within grooves 194. Thus, the gliding mechanism can reduce the friction between second stage 190 and first stage 180 during translation of the second stage relative to housing 150. Additionally, or alternatively, the gliding mechanism can help to enable smooth translation of second stage 190 relative to housing 150 by preventing binding or jarring of the second stage during translation.

In some embodiments, first actuating member 182 is actuated to cause translation of first stage 180 in the X-direction. For example, in the embodiments shown in FIGS. 1 and 2, first actuating member 182 is a shape memory alloy (SMA) member that changes in length in response to an electrical bias to push or pull first stage 180 in the X-direction. Additionally, or alternatively, actuator 170 comprises an elastic member (not shown) that cooperates with first actuating member 182 to cause translation of first stage 180 in the X-direction. For example, the elastic member is a spring positioned opposite first actuating member 182 to provide an opposing force on first stage 180 (e.g., to smooth movement or urge the first stage into a rest position). In some embodiments, second stage 190 rests on first stage 180. Thus, translation of first stage 180 in the X-direction causes a corresponding translation of second stage 190 in the X-direction. In some embodiments, second actuating member 192 is actuated to cause translation of second stage 190 in the Y-direction. For example, in the embodiments shown in FIGS. 1 and 2, actuating member 192 is a SMA member that changes in length in response to an electrical bias to push or pull second stage 190 in the Y-direction. Additionally, or alternatively, actuator 170 comprises an elastic member (not shown) that cooperates with second actuating member 192 to cause translation of second stage 190 in the Y-direction. By combining one-dimensional actuation of first stage 180 and one-dimensional actuation of second stage 190, the first stage and the second stage cooperatively function as a two-dimensional mechanical actuator that is capable of translating the second stage in two orthogonal directions (e.g., the X-direction and the Y-direction). Such two-dimensional mechanical translation is significantly simpler than mechanical translation in three or more dimensions and, therefore, the two-dimensional mechanical actuator can be designed to occupy a significantly smaller volume within the camera module.

In some embodiments, lens assembly 130 is mounted to mechanical actuator 170 such that the mechanical actuator causes relative translation between the lens assembly and image sensor 110. For example, in the embodiments shown in FIGS. 1 and 2, lens assembly 130 is mounted to second stage 190 such that translation of first stage 180 and/or the second stage causes a corresponding translation of the lens assembly. In some embodiments, first stage 180 comprises an opening 188 and/or second stage 190 comprises an opening 198. For example, opening 188 and opening 198 can be at least partially aligned to provide an optical pathway through mechanical actuator 170 so that lens assembly 130 can focus the image on image sensor 110. In some embodiments, opening 188 is larger than opening 198 so that the optical pathway remains clear as second stage 190 is translated relative to first stage 180. Additionally, or alternatively, lens assembly 130 can be at least partially received within opening 198 to mount the lens assembly to second stage 190.

In some embodiments, mechanical actuator 170 causes rotation of image sensor 110 in a third rotational direction about optical axis 176. For example, in the embodiments shown in FIGS. 1 and 2, mechanical actuator 170 comprises an actuating member 178 that is coupled to image sensor 110 (e.g., near a corner of the image sensor) to cause rotation of the image sensor relative to lens assembly 130 in the third rotational direction. For example, actuating member 178 is a microelectromechanical systems (MEMS) actuator that causes rotation of image sensor 110 relative to lens assembly 130. Such rotation of image sensor 110 about optical axis 176 can enable mechanical actuator 170 to perform the OIS function in an additional axis (e.g., the third rotational direction, or the roll direction) as described herein.

In various embodiments, image sensor 110 comprises a semiconductor charge-coupled device (CCD), a complementary metal-oxide-semiconductor (CMOS), an N-type metal-oxide-semiconductor (NMOS), another image sensing device, or a combination thereof. Image sensor 110 detects image light focused on the image sensor by lens assembly 130 to capture the image represented by the image light.

Although actuating members 182 and 192 are described in reference to FIGS. 1 and 2 as SMA actuators and actuating member 178 is described as a MEMS actuator, other embodiments are included in this disclosure. For example, in other embodiments, each of the actuating members is, independently, an SMA actuator, a voice coil motor (VCM), a MEMS actuator (e.g., an electrostatic actuator such as a comb-drive actuator, a magnetic actuator, a piezoelectric actuator, a thermal actuator, or a thermostatic actuator), a picomotor, combinations thereof, or another actuating device that is capable of causing translation of lens assembly 130 relative to image sensor 110 and/or rotation of the image sensor about optical axis 176.

Although mechanical actuator 170 is described in reference to FIGS. 1 and 2 as comprising first stage 180 and second stage 190 to cooperatively enable two-dimensional translation of lens assembly 130 relative to image sensor 110, other embodiments are included in this disclosure. For example, in other embodiments, the mechanical actuator comprises a single stage that is configured to translate in two orthogonal directions (e.g., the actuators described in U.S. Patent Application Pub. No. 2016/0337592, which is incorporated herein by reference in its entirety) or another actuator configuration that is capable of mechanical translation in two orthogonal directions.

Although mechanical actuator 170 is described in reference to FIGS. 1 and 2 as causing translation of lens assembly 130 while image sensor 110 remains fixed in the X-direction and the Y-direction, other embodiments are included in this disclosure. For example, in other embodiments, the lens assembly remains fixed in the X-direction and the Y-direction, and the mechanical actuator causes translation of the image sensor. In some of such embodiments, the image sensor is mounted to the mechanical actuator as opposed to the lens assembly. In other embodiments, the mechanical actuator causes translation of both the lens assembly and the image sensor. For example, the mechanical actuator causes translation of the lens assembly in one direction (e.g., the X-direction) and translation of the image sensor in the orthogonal direction (e.g., the Y-direction). In some of such embodiments, the lens assembly is mounted to a first portion of the mechanical actuator, and the image sensor is mounted to a second portion of the mechanical actuator. The first and second portions of the mechanical actuator can operate independently of one another, but cooperate to enable relative translation between the lens assembly and the image sensor in the two orthogonal directions.

Figure 3:
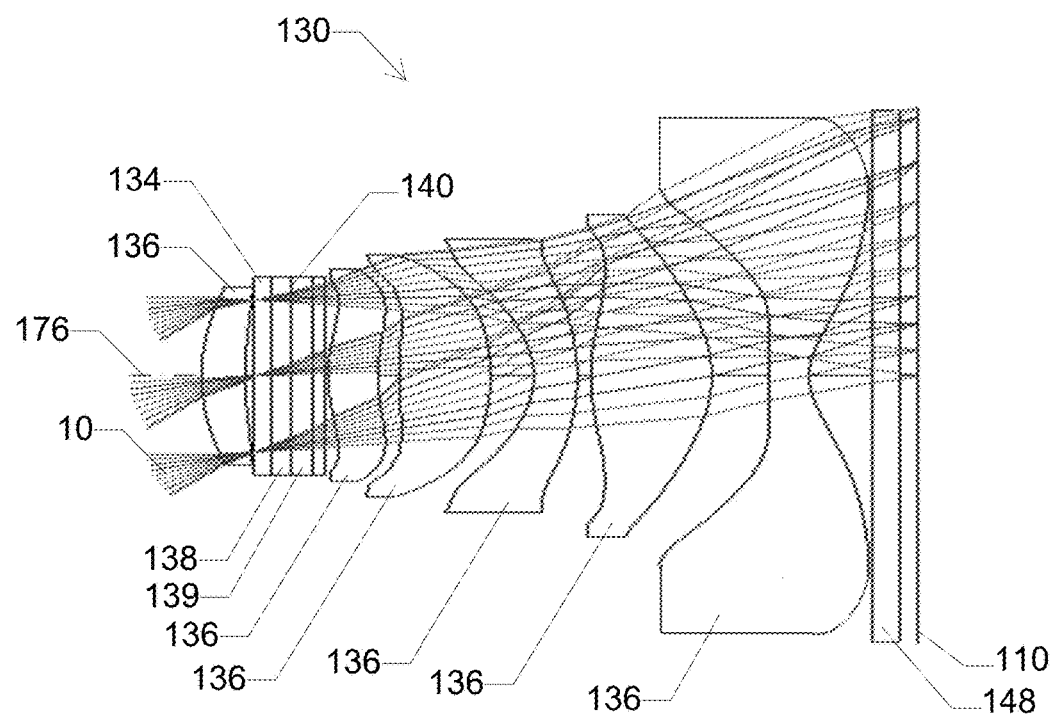
FIG. 3 is a schematic cross-sectional view some embodiments of a lens assembly taken along a plane including an optical axis.

FIG. 3 is a schematic cross-sectional view some embodiments of lens assembly 130 taken along a plane including optical axis 176. Lens assembly 130 comprises a variable focus lens 134. In some embodiments, lens assembly 130 comprises one or more fixed lenses 136. Variable focus lens 134 and fixed lenses 136 can be arranged along optical axis 176 to focus image light 10 on image sensor 110 as described herein.

In some embodiments, variable focus lens 134 is a liquid lens as described herein. The focus of the liquid lens can be changed by changing the shape of the interface between the different liquids contained within the lens and without translating, tilting, or otherwise moving lens assembly 130 relative to image sensor 110. In other embodiments, the variable focus lens is a hydrostatic fluid lens comprising a fluid disposed within a flexible membrane. The focus of the hydrostatic fluid lens can be changed by changing the curvature of the flexible membrane (e.g., by injecting or withdrawing fluid and/or by applying an exterior force to the fluid lens), and without translating, tilting, or otherwise moving the lens assembly relative to the image sensor. In other embodiments, the variable focus lens is a liquid crystal lens or another type of lens having a focal length that can be changed without translating, tilting, or otherwise moving the lens assembly relative to the image sensor.

Figure 4:
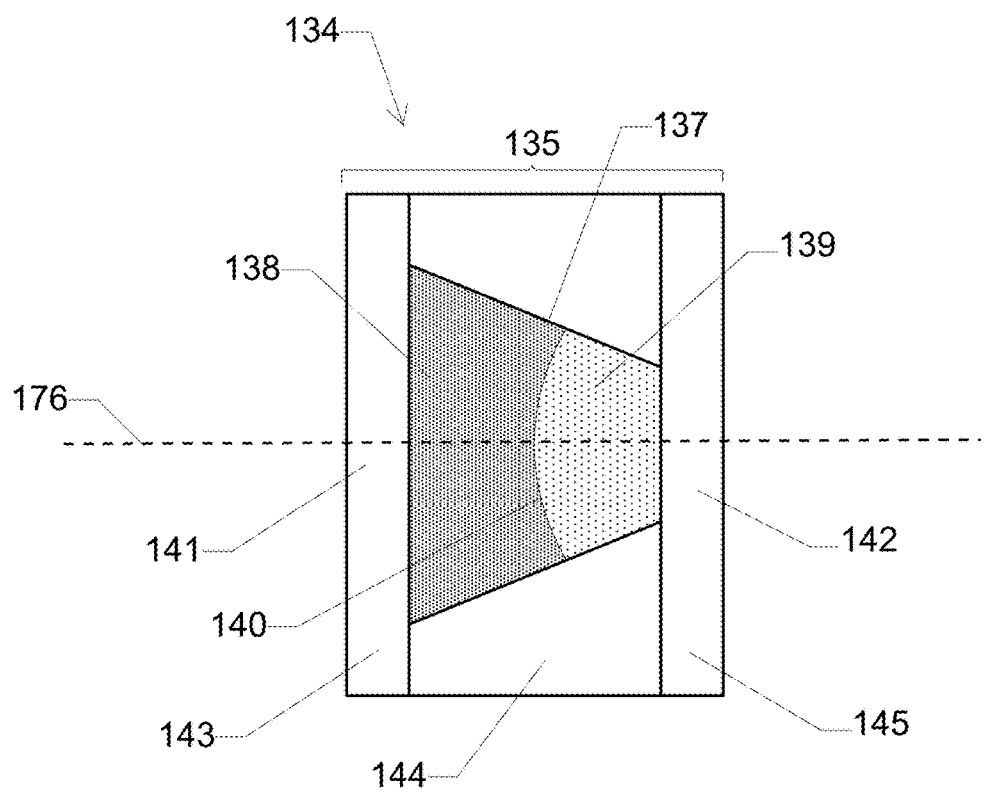
FIG. 4 is a schematic cross-sectional view of some embodiments of a variable focus lens.

FIG. 4 is a schematic cross-sectional view of some embodiments of variable focus lens 134. In the embodiments shown in FIG. 4, variable focus lens 134 is a liquid lens. For example, variable focus lens 134 comprises a lens body 135 and a cavity 137 formed in the lens body. A first liquid 138 and a second liquid 139 are disposed within cavity 137. In some embodiments, first liquid 138 is a polar liquid or a conducting liquid. Additionally, or alternatively, second liquid 139 is a non-polar liquid or an insulating liquid. In some embodiments, first liquid 138 and second liquid 139 are substantially immiscible with each other and have different refractive indices such that an interface 140 between the first liquid and the second liquid forms a lens. Interface 140 can be adjusted via electrowetting. For example, a voltage can be applied between first liquid 138 and a surface of cavity 137 (e.g., an electrode positioned near the surface of the cavity and insulated from the first liquid) to increase or decrease the wettability of the surface of the cavity with respect to the first liquid and change the shape of interface 140. In some embodiments, adjusting interface 140 changes the shape of the interface, which changes the focal length or focus of variable focus lens 134. For example, such a change of focal length can enable variable focus lens 134 to perform an autofocus function as described herein. Additionally, or alternatively, adjusting interface 140 tilts the interface relative to optical axis 176. For example, such tilting can enable variable focus lens 134 to perform an OIS function in two axes (e.g., rotation in each of the first rotational direction and the second rotational direction) as described herein. Adjusting interface 140 can be achieved without physical movement of variable focus lens 134 relative to image sensor 110 as described herein. In some embodiments, first liquid 138 and second liquid 139 have substantially the same density, which can help to avoid changes in the shape of interface 140 as a result of changing the physical orientation of variable focus lens 134 (e.g., as a result of gravitational forces).

In some embodiments, lens body 135 of variable focus lens 134 comprises a first window 141 and a second window 142. In some of such embodiments, cavity 137 is disposed between first window 141 and second window 142. In some embodiments, lens body 135 comprises a plurality of layers that cooperatively form the lens body. For example, in the embodiments shown in FIG. 4, lens body 135 comprises a first outer layer 143, an intermediate layer 144, and a second outer layer 145. In some of such embodiments, intermediate layer 144 comprises a bore formed therethrough, first outer layer 143 is bonded to one side (e.g., the object side) of the intermediate layer, and second outer layer 145 is bonded to the other side (e.g., the image side) of the intermediate layer such that the intermediate layer is disposed between the first outer layer and the second outer layer, the bore is covered on opposing sides by the first outer layer and the second outer layer, and cavity 137 is defined within the bore. Thus, a portion of first outer layer 143 covering cavity 137 serves as first window 141, and a portion of second outer layer 145 covering the cavity serves as second window 142. In some embodiments, cavity 137 is tapered as shown in FIG. 4 such that a cross-sectional area of the cavity decreases along optical axis 176 in a direction from the object side to the image side. Such a tapered cavity can help to maintain alignment of interface 140 between first liquid 138 and second liquid 139 along optical axis 176. In other embodiments, the cavity is tapered such that the cross-sectional area of the cavity increases along the optical axis in the direction from the object side to the image side or non-tapered such that the cross-sectional area of the cavity remains substantially constant along the optical axis.

In some embodiments, image light 10 enters variable focus lens 134 through first window 141, is refracted at interface 140 between first liquid 138 and second liquid 139, and exits the variable focus lens through second window 142. In some embodiments, first outer layer 143 and/or second outer layer 145 comprise a sufficient transparency to enable passage of image light 10 as described herein. For example, first outer layer 143 and/or second outer layer 275 comprise a polymeric, glass, ceramic, or glass-ceramic material. In some embodiments, outer surfaces of first outer layer 143 and/or second outer layer 145 are substantially planar. Thus, even though variable focus lens 134 can function as a lens (e.g., by refracting image light 10 passing through interface 140), outer surfaces of the variable focus lens can be flat as opposed to being curved like the outer surfaces of a fixed lens. In other embodiments, outer surfaces of the first outer layer and/or the second outer layer are curved (e.g., concave or convex). Thus, the variable focus lens comprises an integrated fixed lens. In some embodiments, intermediate layer 144 comprises a metallic, polymeric, glass, ceramic, or glass-ceramic material. Because image light 10 can pass through the bore through intermediate layer 144, the intermediate layer may or may not be transparent.

In some embodiments, lens assembly 130 comprises an optical filter 148 as shown in FIG. 3. For example, optical filter 148 is a spectral filter that blocks or removes radiation to which image sensor 110 is sensitive, but which is not corrected by the optical train (e.g., the lenses of lens assembly 130). In some embodiments, the optical train is corrected in the visible region (e.g., about 450 nm to about 650 nm), and optical filter 148 blocks or rejects radiation in the near-infrared (near-IR) region (e.g., about 650 nm to about 1500 nm) and shorter UV region (e.g., less than about 450 nm). Thus, optical filter 148 can be referred to as an infrared (IR) cut filter and/or a blue filter.

Figures 5A, 5B, 5C:
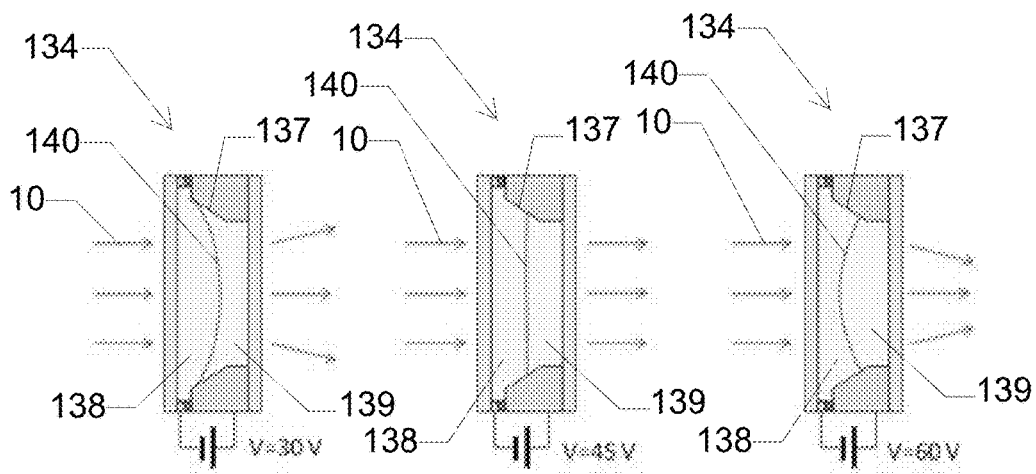
FIGS. 5A-5C are schematic cross-sectional views of some embodiments of a variable focus lens set at different focal lengths.

In various embodiments, mechanical actuator 170 and variable focus lens 134, individually or cooperatively, perform autofocus and OIS functions. For example, in some embodiments, variable focus lens 134 performs an autofocus function. FIGS. 5A-5C are schematic cross-sectional views of some embodiments of variable focus lens 134 set at different focal lengths. As shown in FIG. 5A, a relatively low voltage can be applied between first liquid 138 and the surface of cavity 137 resulting in the surface of the cavity having a relatively low wettability with respect to the first liquid such that interface 140 forms a negative lens. As shown in FIG. 5B, an intermediate voltage can be applied between first liquid 138 and the surface of cavity 137 resulting in the surface of the cavity having an intermediate wettability with respect to the first liquid such that interface 140 has substantially no optical power. As shown in FIG. 5C, a relatively high voltage can be applied between first liquid 138 and the surface of cavity 137 resulting in the surface of the cavity having a relatively high wettability with respect to the first liquid such that interface 140 forms a positive lens. Thus, the shape of interface 140 can be adjusted to change the focal length of variable focus lens 134.

As used herein, the terms "relatively low voltage," "intermediate voltage," and "relatively high voltage" are relative terms, meaning that a relatively low voltage is less than an intermediate voltage, which is less than a relatively high voltage. Thus, the terms do not indicate any particular magnitude of voltage, which may depend on the configuration of the variable focus lens, the properties of the fluids, etc.

In some embodiments, variable focus lens 134 is adjustable to perform an autofocus function. For example, the focal length of variable focus lens 134 is adjusted (e.g., by adjusting the shape of interface 140) in response to a distance between an object and camera module 100 (e.g., an input indicative of the distance between the object and the camera module) such that lens assembly 130 focuses an image of the object on image sensor 110. Additionally, or alternatively, the focal length of variable focus lens 134 is adjusted in response to a quality of an image detected by image sensor 110 (e.g., an input indicative of the quality of the image) such that lens assembly 130 focuses the image on the image sensor. Variable focus lens 134 enables performing the autofocus function without any physical movement of lens assembly 130 relative to image sensor 110. Thus, in some embodiments, lens assembly 130 is fixed relative to image sensor 110 in a Z-direction parallel to optical axis 176.

Figure 6A:
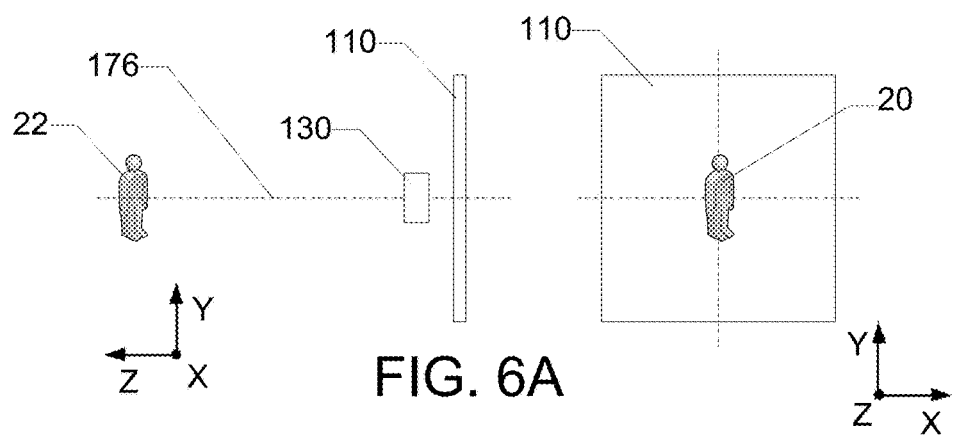
FIGS. 6A-6C are schematic views of some embodiments of a lens assembly focusing an image of an object on an image sensor.
Figure 6B:
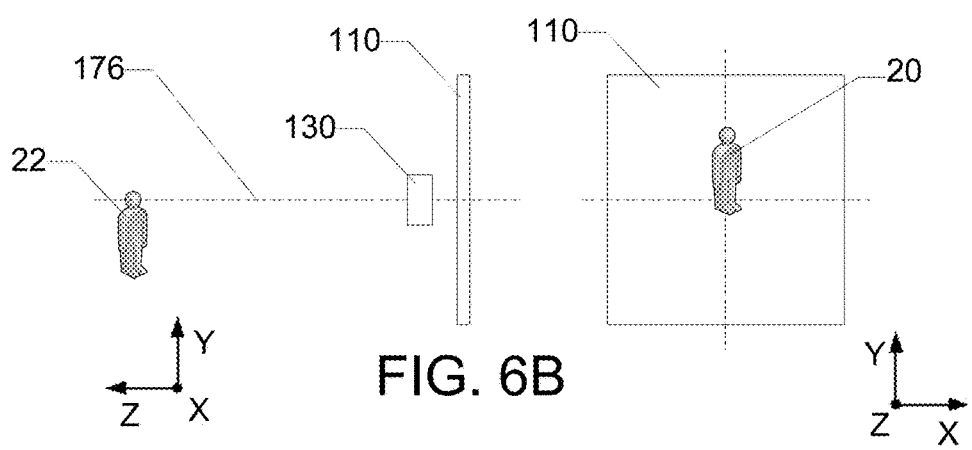
Figure 6C:
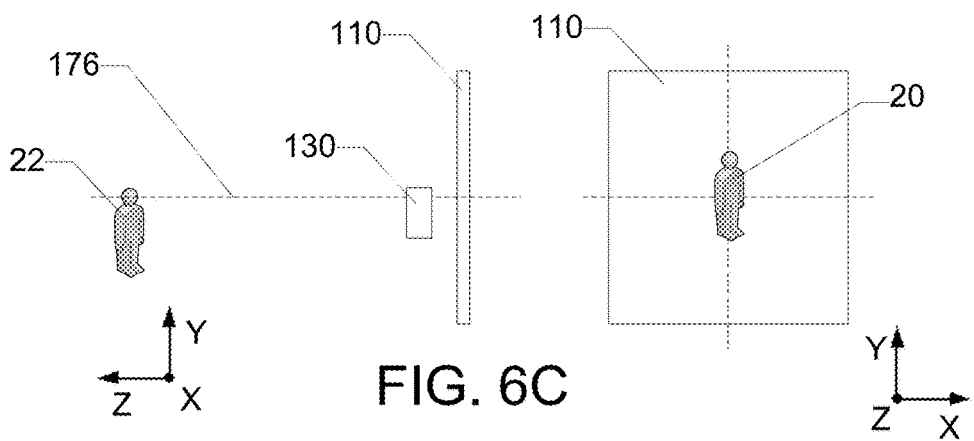

In some embodiments, mechanical actuator 170 performs an OIS function. FIGS. 6A-6C are schematic views of lens assembly 130 focusing an image 20 of an object 22 on image sensor 110. Each of FIGS. 6A-6C shows a side view of object 22 relative to lens assembly 130 and image sensor 110 and a corresponding front view of image 20 on the image sensor. FIG. 6A shows an initial alignment of object 22 and lens assembly 130 that results in image 20 being focused approximately at the center of image sensor 110. FIG. 6B shows an adjusted alignment in which object 22 is shifted downward in the Y-direction relative to camera module 100 without any corresponding translation of lens assembly 130 relative to image sensor 110. Such a shift of object 22 relative to camera module 100 can be caused, for example, by upward translation of the camera module while object 22 remains stationary. As a result of the shift of object 22 relative to camera module 100, image 20 is shifted upward in the Y-direction on image sensor 110. FIG. 6C shows the same adjusted alignment of object 22 relative to camera module 100 as shown in FIG. 6B, but with a corresponding translation of lens assembly 130 relative to image sensor 110 in the downward Y-direction. As a result of the corresponding translation of lens assembly 130 relative to image sensor 110, image 20 is focused approximately at the center of image sensor 110 as shown in FIG. 6C. Thus, the position of image 20 on image sensor 110 can be maintained as the position of object 22 shifts relative to camera module 100 by translating lens assembly 130 relative to the image sensor. In some embodiments, such translation of lens assembly 130 relative to image sensor 110 is performed by mechanical actuator 170 as described herein.

Although FIGS. 6A-6C illustrate a translation of lens assembly 130 relative to image sensor 110 in the Y-direction to compensate for a shift of object 22 relative to camera module 100 in the Y-direction, other embodiments are included in this disclosure. For example, in some embodiments, the lens assembly is translated in the X-direction to compensate for a shift of the object relative to the camera module in the X-direction. In some embodiments, the lens assembly is translated in both the X-direction and the Y-direction to compensate for a shift of the object relative to the camera module in both the X-direction and the Y-direction.

Figure 7A:
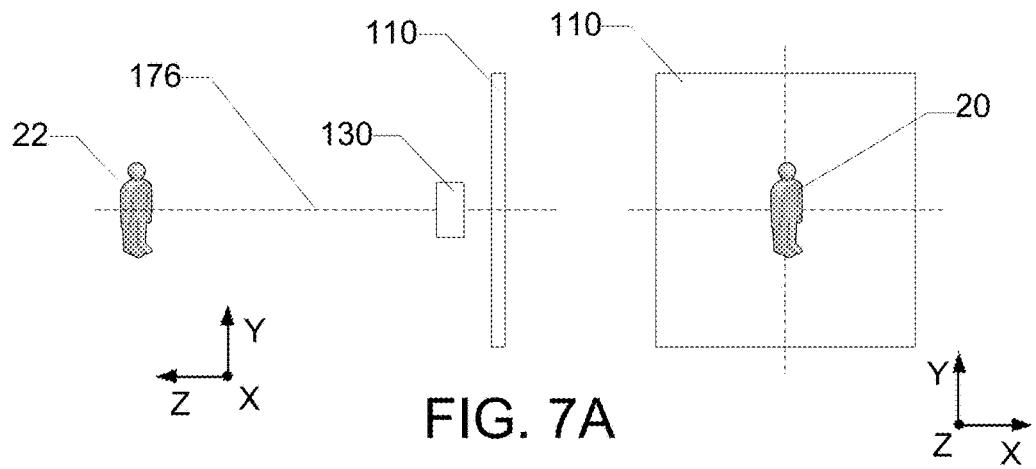
FIGS. 7A-7C are schematic views of some embodiments of a lens assembly focusing an image of an object on an image sensor.
Figure 7B:
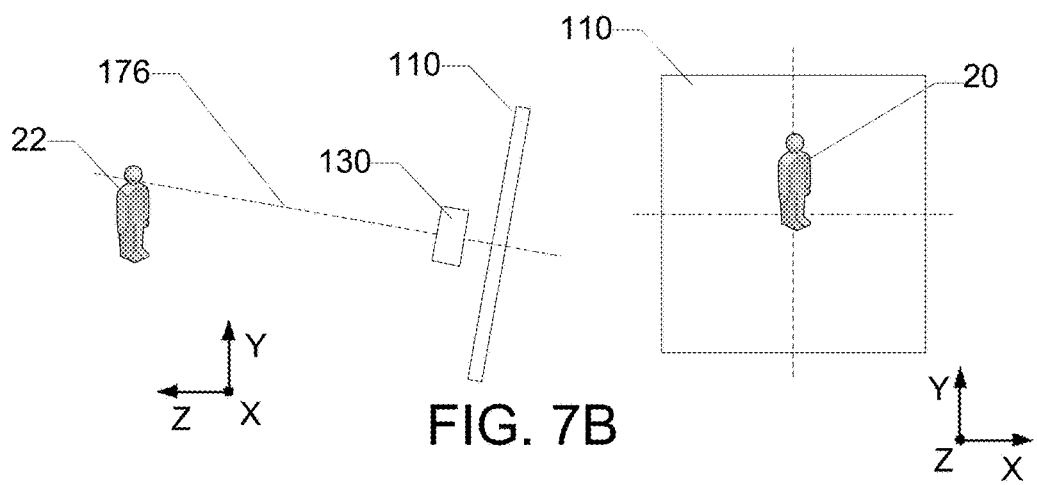
Figure 7C:
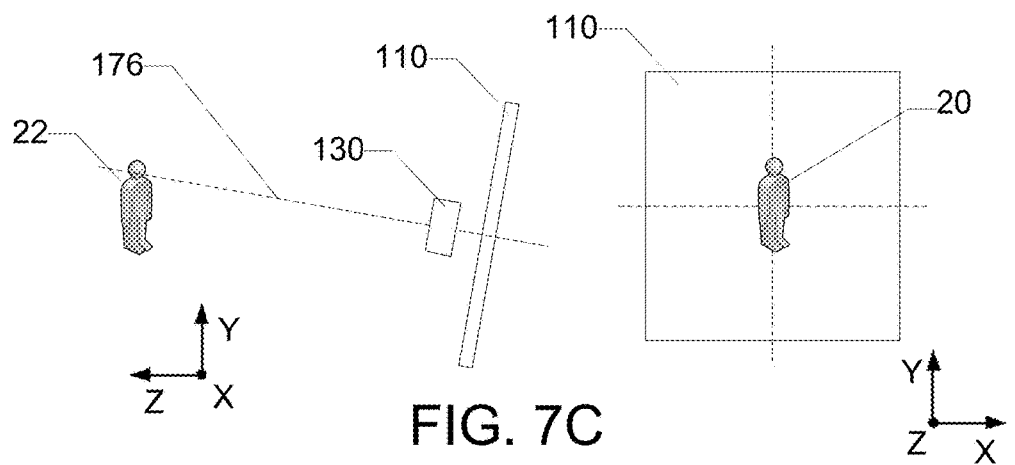

In some embodiments, mechanical actuator 170 performs an OIS function. FIGS. 7A-7C are schematic views of lens assembly 130 focusing image 20 of object 22 on image sensor 110. Each of FIGS. 7A-7C shows a side view of object 22 relative to lens assembly 130 and image sensor 110 and a corresponding front view of image 20 on the image sensor. FIG. 7A shows the initial alignment of object 22 and camera module 100 that results in image 20 being focused approximately at the center of image sensor 110. FIG. 7B shows an adjusted alignment resulting from rotation of camera module 100 in the first rotational direction about first lateral axis 172 (e.g., pitch of the camera module) without any corresponding translation of lens assembly 130 relative to image sensor 110. As a result of the rotation of camera module 100, image 20 is shifted upward in the Y-direction on image sensor 110. FIG. 7C shows the same adjusted alignment of object 22 and camera module 100 as shown in FIG. 7B, but with a corresponding translation of lens assembly 130 relative to image sensor 110 in the downward Y-direction. As a result of the corresponding translation of lens assembly 130 relative to image sensor 110, image 20 is focused approximately at the center of image sensor 110 as shown in FIG. 7C. Thus, the position of image 20 on image sensor 110 can be maintained as camera module 100 moves in the first rotational direction by adjusting the lateral position of lens assembly 130 relative to image sensor 110.

Although FIGS. 7A-7C illustrate adjusting the lateral position of lens assembly 130 relative to image sensor 110 in the Y-direction to compensate for movement of camera module 100 in the first rotational direction, other embodiments are included in this disclosure. For example, in some embodiments, the lateral position of the lens assembly is adjusted (e.g., in the X-direction) to compensate for movement of the camera module in the second rotational direction about second lateral axis 174 (e.g., yaw of the camera module). In some embodiments, the lateral position of the lens assembly relative to the image sensor is adjusted to compensate for movement of the camera module in both the first rotational direction and the second rotational direction (e.g., both pitch and yaw of the camera module).

In some embodiments, the lateral position of lens assembly 130 relative to image sensor 110 is adjustable to perform the OIS function. For example, the lateral position of lens assembly 130 relative to image sensor 110 is adjusted in response to movement of camera module 100 (e.g., an input indicative of movement of the camera module) to maintain the position of the image of the object on the image sensor. In some embodiments, the lateral position of lens assembly 130 relative to image sensor 110 to adjust the focal point of the lens assembly in at least one of the X-direction or the Y-direction. For example, the lateral position of lens assembly 130 relative to image sensor 110 is variable to adjust the focal point of the lens assembly in the X-direction to compensate for changes in the yaw of camera module 100. Additionally, or alternatively, the lateral position of lens assembly 130 relative to image sensor 110 is variable to adjust the focal point of the lens assembly in the Y-direction to compensate for changes in the pitch of camera module 100. By enabling adjustment of the focal point in the two orthogonal directions, mechanical actuator 170 is capable of performing the OIS function in two axes.

In some embodiments, mechanical actuator 170 causes relative translation between lens assembly 130 and image sensor 110 to perform the OIS function. For example, the lateral position (e.g., the position in the X-direction and/or the Y-direction) of lens assembly 130 relative to image sensor 110 is adjusted in response to movement of camera module 100 (e.g., an input indicative of movement of the camera module in the X-direction, the Y-direction, the first rotational direction, or pitch, and/or the second rotational direction, or yaw) to maintain the position of the image of the object on the image sensor. By enabling movement in the two orthogonal directions, mechanical actuator 170 is capable of performing the OIS function in two axes (e.g., first lateral axis 172 and second lateral axis 174).

In some embodiments, the lateral position of lens assembly 130 relative to image sensor 110 is variable to adjust the position of image 20 on image sensor 110 without any physical rotation of the lens assembly relative to the image sensor. In some of such embodiments, lens assembly 130 is fixed relative to image sensor 110 in each of the first rotational direction about the first lateral axis and the second rotational direction about the second lateral axis.

Figures 8A, 8B, 8C:
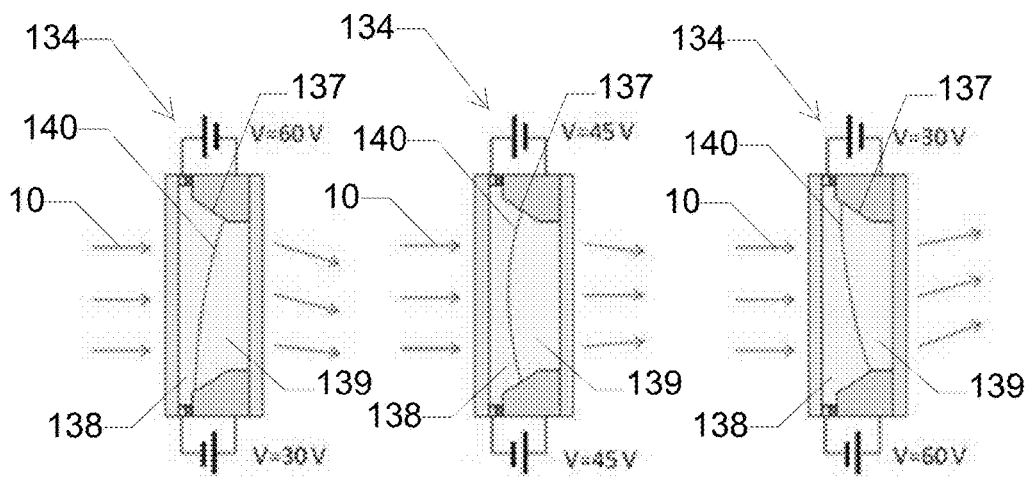
FIGS. 8A-8C are schematic cross-sectional views of some embodiments of a variable focus lens set at different tilt positions.

In some embodiments, a tilt of variable focus lens 134 is adjustable to adjust the focal point of lens assembly 130 in the X-direction and/or the Y-direction. Such adjustment of the tilt can enable variable focus lens 134 to perform an OIS function as described herein. FIGS. 8A-8C are schematic cross-sectional views of some embodiments of variable focus lens 134 set at different tilt positions. Different voltages between first liquid 138 and the surface of cavity 137 can be applied at different regions of the surface. For example, as shown in FIG. 8A, a relatively low voltage is applied at a first region (e.g., a lower region) of the surface, and a relatively high voltage is applied at a second region (e.g., an upper region) of the surface. Such an application of voltage results in the surface having a lower wettability with respect to first fluid 138 at the first region and a higher wettability with respect to the first fluid at the second region, which causes interface 140 to tilt or decenter within cavity 137. Such tilting of interface 140 causes image light 10 to exit variable focus lens 134 at a different angle relative to optical axis 176 than the image light enters the variable focus lens. As shown in FIG. 8B, an intermediate voltage is applied at both the first region and the second region of the surface. Such an application of voltage results in the surface having substantially the same wettability with respect to first fluid 138 at the first region and the second region, which causes interface 140 to remain substantially centered within cavity 137. Such centering of interface 140 causes image light 10 to exit variable focus lens 134 at substantially the same angle relative to optical axis 176 as the image light enters the variable focus lens. As shown in FIG. 8C, a relatively high voltage is applied at the first region (e.g., the lower region) of the surface, and a relatively low voltage is applied at the second region (e.g., the upper region) of the surface. Such an application of voltage results in the surface having a higher wettability with respect to first fluid 138 at the first region and a lower wettability with respect to the first fluid at the second region, which causes interface 140 to tilt or decenter within cavity 137. Such tilting of interface 140 causes image light 10 to exit variable focus lens 134 at a different angle relative to optical axis 176 than the image light enters the variable focus lens. Because the application of the relatively high and relatively low voltages in the configuration shown in FIG. 8C are reversed compared to the configuration shown in FIG. 8A, the tilting of interface 140 and the change in direction of image light 10 exiting variable focus lens 134 are in opposite directions compared to the configuration shown in FIG. 8A.

In some embodiments, variable focus lens 134 performs an OIS function. FIGS. 7A-7C are schematic views of lens assembly 130 focusing image 20 of object 22 on image sensor 110. Each of FIGS. 7A-7C shows a side view of object 22 relative to lens assembly 130 and image sensor 110 and a corresponding front view of image 20 on the image sensor. The focal point of lens assembly 130 can be adjusted in the X-direction and/or the Y-direction by adjusting the lateral position of lens assembly 130 relative to image sensor 110 as described above with reference to FIGS. 7A-7C and/or by adjusting the tilt of variable focus lens 134 as described below also with reference to FIGS. 7A-7C. FIG. 7A shows the initial alignment of object 22 and camera module 100 that results in image 20 being focused approximately at the center of image sensor 110. FIG. 7B shows an adjusted alignment resulting from rotation of camera module 100 in the first rotational direction about first lateral axis 172 (e.g., pitch of the camera module) without any corresponding adjustment of the tilt of variable focus lens 134 while object 22 remains stationary. As a result of the rotation of camera module 100, image 20 is shifted upward in the Y-direction on image sensor 110. FIG. 7C shows the same adjusted alignment of object 22 and camera module 100 as shown in FIG. 7B, but with a corresponding adjustment of the tilt of variable focus lens 134. As a result of the corresponding adjustment of the tilt of variable focus lens 134, image 20 is focused approximately at the center of image sensor 110. Thus, the position of image 20 on image sensor 110 can be maintained as camera module 100 moves in the first rotational direction by adjusting the tilt of variable focus lens 134.

Although FIGS. 7A-7C illustrate adjusting the tilt of variable focus lens 134 to compensate for movement of camera module 100 in the first rotational direction, other embodiments are included in this disclosure. For example, in some embodiments, the tilt of the variable focus lens is adjusted to compensate for movement of the camera module in the second rotational direction about second lateral axis 174 (e.g., yaw of the camera module). In some embodiments, the tilt of the variable focus lens is adjusted to compensate for movement of the camera module in both the first rotational direction and the second rotational direction (e.g., both pitch and yaw of the camera module).

In some embodiments, the tilt of variable focus lens 134 is adjustable to perform the OIS function. For example, the tilt of variable focus lens 134 is adjusted in response to movement of camera module 100 (e.g., an input indicative of movement of the camera module) to maintain the position of the image of the object on the image sensor. In some embodiments, the tilt of interface 140 is variable to adjust the focal point of lens assembly 130 in at least one of the X-direction or the Y-direction. For example, the tilt of interface 140 is variable to adjust the focal point of lens assembly 130 in the X-direction to compensate for changes in the yaw of camera module 100. Additionally, or alternatively, the tilt of interface 140 is variable to adjust the focal point of lens assembly 130 in the Y-direction to compensate for changes in the pitch of camera module 100. For example, the tilt of interface 140 is adjustable in the first rotational direction and/or the second rotational direction to adjust the focal point of lens assembly 130 in the Y-direction and/or the X-direction. By enabling adjustment of the focal point in the two orthogonal directions, variable focus lens 134 is capable of performing the OIS function in two axes.

In some embodiments, the tilt of interface 140 is variable to adjust the position of image 20 on image sensor 110 without any physical movement of lens assembly 130 relative to the image sensor. In some of such embodiments, lens assembly 130 is fixed relative to image sensor 110 in each of the first rotational direction about the first lateral axis and the second rotational direction about the second lateral axis.

In some embodiments, both of mechanical actuator 170 and variable focus lens 134 perform an OIS function. For example, mechanical actuator 170 performs the OIS function in two axes (e.g., lateral movement of lens assembly 130 relative to image sensor 110 along each of the first lateral axis, or the X-direction, and the second lateral axis, or the Y-direction), and variable focus lens 134 performs the OIS function in two axes (e.g., tilting of interface 140 in each of the first rotational direction, or the pitch direction, and the second rotational direction, or the yaw direction). In some of such embodiments, the OIS function is performed with mechanical motion in two or fewer axes (e.g., planar motion in an X-Y plane). For example, mechanical actuator 170 causes translation of lens assembly 130 relative to image sensor 110 in the X-direction and/or the Y-direction, while the lens assembly is fixed relative to the image sensor in each of the Z-direction, the first rotational direction, and the second rotational direction.

In some embodiments, mechanical actuator 170 and variable focus lens 134 cooperatively perform the OIS function in response to movement of camera module 100 in the first rotational direction (e.g., the pitch direction) and/or the second rotational direction (e.g., the yaw direction). For example, variable focus lens 134 is adjusted in response to relatively small movements of camera module 100 in the first rotational direction and/or the second rotational direction, and mechanical actuator 170 is adjusted in response to relatively large movements of the camera module in the first rotational direction and/or the second rotational direction. Thus, the tilt of variable focus lens 134 is adjusted (e.g., by tilting interface 140) in response to relatively small movements, and mechanical actuator 170 is adjusted (e.g., by translating lens assembly 130 in the X-direction and/or the Y-direction) in response to relatively large movements to maintain the position of image 20 on image sensor 100 during such movements of camera module 100. For example, as camera module 100 begins to move in the first rotational direction (e.g., due to shaking or vibration of the camera module), the tilt of interface 140 is adjusted to maintain the position of image 20 on image sensor 110. Once the movement of camera module 100 exceeds the upper limit for a relatively small movement and becomes a relatively large movement, mechanical actuator 170 is adjusted to continue to maintain the position of image 20 on image sensor 110. Thus, variable focus lens 134 and mechanical actuator 170 cooperatively compensate for the rotational movement of camera module 100.

In some embodiments, relatively small movements are rotational movements of greater than 0° and at most about 3°, at most about 2°, at most about 1.5°, at most about 1°, at most about 0.9°, at most about 0.8°, at most about 0.7°, at most about 0.6°, at most about 0.5°, at most about 0.4°, at most about 0.3°, at most about 0.2°, at most about 0.1°, at most about 0.05°, at most about 0.04°, at most about 0.03°, at most about 0.02°, or at most about 0.01°, Additionally, or alternatively, relatively large movements are rotational movements that are larger than relatively small rotational movements (e.g., movements that exceed the upper limit for relatively small movements), Rotational movements are expressed herein in terms of magnitude of rotational movement relative to an initial position. Thus, a rotational movement of about 1° can be used to express a 1° rotation of camera module 100 about a lateral axis in an upward rotational direction, a downward rotational direction, a rightward rotational direction, a leftward rotational direction, or a combination thereof.

In some embodiments, the tilting of interface 140 of variable focus lens 134 can be accomplished more quickly and/or using less power than the translation of lens assembly 130 relative to image sensor 110. However, excessive tilting of interface 140 of variable focus lens 134 can cause image distortion. The amount of tilting that constitutes excessive tilting depends on the position of variable focus lens 134 within lens assembly 130, the focal length of the lens assembly during the tilting, and other characteristics of the lens assembly, image sensor 110, and/or camera module 100. By correcting for smaller movements of camera module 100 with variable focus lens 134 and correcting for larger movements of the camera module with mechanical actuator 170, the camera module can respond quickly to small movements with reduced power consumption, while still being able to make larger corrections without substantial image distortion. Thus, the combination of variable focus lens 134 and mechanical actuator 170 can enable improved OIS performance compared to use of either a variable focus lens alone or a mechanical actuator alone.

In some embodiments, mechanical actuator 170 performs the OIS function in three axes (e.g., lateral movement of lens assembly 130 relative to image sensor 110 along each of the first lateral axis, or the X-direction, and the second lateral axis, or the Y-direction, as well as rotation of the image sensor in the third rotational direction, or the roll direction), and variable focus lens 134 performs the OIS function in two axes (e.g., tilting of interface 140 in each of the first rotational direction, or the pitch direction, and the second rotational direction, or the yaw direction). In some of such embodiments, the OIS function is performed with mechanical motion in three or fewer axes. For example, mechanical actuator 170 causes translation of lens assembly 130 relative to image sensor 110 in the X-direction and/or the Y-direction and rotation of image sensor 110 in the third rotational direction about optical axis 176, while the lens assembly is fixed relative to the image sensor in each of the Z-direction, the first rotational direction, and the second rotational direction.

In some embodiments, variable focus lens 134 and mechanical actuator 170 cooperatively operate to perform the OIS function in four or more axes (e.g., lateral movement of lens assembly 130 relative to image sensor 110 along each of the first lateral axis, or the X-direction, and the second lateral axis, or the Y-direction, as well as tilting of interface 140 in each of the first rotational direction, or the pitch direction, and the second rotational direction, or the yaw direction) with mechanical motion in two or fewer axes (e.g., translation along the first lateral axis, or the X-direction, and/or the second lateral axis, or the Y-direction). Additionally, or alternatively, variable focus lens 134 and mechanical actuator 170 cooperatively operate to perform the OIS function in five or more axes (e.g., lateral movement of lens assembly 130 relative to image sensor 110 along each of the first lateral axis, or the X-direction, and the second lateral axis, or the Y-direction, tilting of interface 140 in each of the first rotational direction, or the pitch direction, and the second rotational direction, or the yaw direction, as well as rotation of the image sensor in the third rotational direction, or the roll direction) with mechanical motion in three or fewer axes (e.g., translation along the first lateral axis, or the X-direction, and the second lateral axis, or the Y-direction, as well as rotation in the third rotational direction, or the roll direction). Additionally, or alternatively, the three or fewer axes of mechanical motion are coplanar. By limiting the amount of mechanical movement of lens assembly 130 relative to image sensor 110 (e.g., to two or three axes), mechanical actuator 170 can be significantly less complex than a mechanical actuator that causes mechanical motion in more axes, as well as occupying less space and using less power.

In some embodiments, camera module 100 comprises a control unit 160 that controls the operation of variable focus lens 134 and/or mechanical actuator 170 as shown in FIGS. 1 and 2. For example, control unit 160 is operatively coupled to variable focus lens 134, first actuating member 182, and second actuating member 192 to control the focal length and/or focal position of the variable focus lens as well as relative movement between lens assembly 130 and image sensor 110 as described herein. In some embodiments, control unit 160 generates an output signal to control the focal length and/or focal position of variable focus lens 134 and relative movement between lens assembly 130 and image sensor 110. For example, control unit 160 generates a first output signal for receipt by variable focus lens 134, and the focal length and/or focal position of the variable focus lens is changed in response to the first output signal. Additionally, or alternatively, control unit 160 generates a second output signal for receipt by mechanical actuator 170, and the relative position between lens assembly 130 and image sensor 110 is changed in response to the second output signal.

In some embodiments, control unit 160 determines the output signal (e.g., the first output signal and/or the second output signal) in response to a distance between object 22 and camera module 100 or a quality of an image detected by image sensor 110 as described herein. For example, control unit 160 determines the output signal in response to receipt of a distance signal from a ranging device or another suitable distance detection device or a quality signal from image sensor 110, an image signal processor, or another suitable imaging device. In some embodiments, control unit 160 determines the output signal (e.g., the first output signal and/or the second output signal) in response to movement of camera module 100. For example, control unit 160 determines the output signal in response to receipt of a movement signal from an accelerometer, a gyroscope, or another suitable detection device.

A single control unit that is operative to control both the variable focus lens and the mechanical actuator can occupy less space than two or more separate control units. Additionally, or alternatively, the single control unit can simplify operation of the camera module compared to two or more control units that may perform some of the same operations as each other. Additionally, or alternatively, the single control unit can use less power compared to two or more control units that may perform some of the same operations as each other. In some embodiments, control unit 160 comprises a low voltage portion and a high voltage portion. The terms "low voltage portion" and "high voltage portion" are relative terms, meaning that a low voltage portion operates at a lower voltage than a high voltage portion. For example, the low voltage portion of control unit 160 can operate at voltages of at most about 10 volts, at most about 5 volts, or at most about 3 volts, which may be suitable for controlling mechanical actuator 170. Additionally, or alternatively, the high voltage portion of control unit 160 can operate at voltages of at least about 10 volts, at least about 20 volts, or at least about 30 volts, which may be suitable for controlling variable focus lens 134 (e.g., a liquid lens). Additionally, or alternatively, the high voltage portion of control unit 160 can operate at voltages of at most about 100 volts, at most about 90 volts, at most about 80 volts, or at most about 70 volts, which may be suitable for controlling variable focus lens 134 (e.g., a liquid lens).

In various embodiments, control unit 160 can comprise one or more of a general processor, a digital signal processor, an application specific integrated circuit, a field programmable gate array, an analog circuit, a digital circuit, a server processor, combinations thereof, or other now known or later developed processor. Control unit 160 can implement one or more of various processing strategies, such as multi-processing, multi-tasking, parallel processing, remote processing, centralized processing, or the like. Control unit 160 can be responsive to or operable to execute instructions stored as part of software, hardware, integrated circuits, firmware, microcode, or the like.

The camera modules described herein may be useful in a variety of applications in which autofocus and/or OIS may be beneficial. For example, the camera modules described herein may be used in consumer electronic devices (e.g., smartphones, tablet computers, digital cameras, media players, gaming systems, virtual reality systems, augmented reality systems, etc.), automobiles (e.g., for backup cameras, front cameras, side cameras, lane assist systems, park assist systems, self-driving systems, etc.), or other devices that may benefit from imaging devices with autofocus and/or OIS functionality.

In some embodiments, a method for operating camera module 100 comprises adjusting a focal length of variable focus lens 134 of lens assembly 130 to perform the autofocus function. For example, the focal length of variable focus lens 134 can be adjusted as described herein in response to a distance between object 22 and camera module 100 or a quality of an image detected by image sensor 110. For example, in some embodiments, the method comprises detecting the distance between object 22 and camera module 110 and adjusting the focal length of variable focus lens 134 in response to the detected distance. Additionally, or alternatively, the method comprises detecting a first image with image sensor 110 with the focal length of variable focus lens 134 at a first focal length value, adjusting the focal length of the variable focus lens to a second focal length value, detecting a second image with the image sensor with the focal length of the variable focus lens at the second focal length value, and adjusting the focal length of the variable focus lens to a third focal length value in response to a comparison between a quality of the first image and a quality of the second image. Thus, multiple images can be captured with the focal length of variable focus lens 134 set at different focal length values, and the quality of the images can be compared to determine which one is in focus. The quality of the images can be represented by contrast, sharpness, phase, or a combination thereof.

In some embodiments, the method for operating camera module 100 comprises adjusting the tilt of interface 140 of variable focus lens 134 and translating lens assembly 130 relative to image sensor 110 in response to movement of camera module 100 in the first rotational direction and/or the second rotational direction. In some of such embodiments, the method comprises detecting the movement of camera module 100. For example, such movement can be detected using an accelerometer, a gyroscope, or another suitable detection device.

In some embodiments, the method for operating camera module 100 comprises rotating image sensor 110 in the third rotational direction about the optical axis in response to movement of the camera module (e.g., in the third rotational direction).

In some embodiments, lens assembly 130 is fixed relative to image sensor 110 in each of the first rotational direction about the first lateral axis, the second rotational direction about the second lateral axis, and the Z-direction parallel to the optical axis.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A camera module comprising:
an image sensor;
a lens assembly positioned to focus an image on the image sensor and comprising a liquid lens comprising a liquid interface; and
a mechanical actuator that causes relative translation between the lens assembly and the image sensor in each of an X-direction parallel to a first lateral axis and a Y-direction parallel to a second lateral axis, the first lateral axis substantially perpendicular to an optical axis of the lens assembly, and the second lateral axis substantially perpendicular to each of the optical axis and the first lateral axis;
wherein the lens assembly is fixed relative to the image sensor in each of a first rotational direction about the first lateral axis and a second rotational direction about the second lateral axis;
wherein a tilt of the liquid interface is adjustable to adjust a focal point of the lens assembly in at least one of the X-direction or the Y-direction to perform an optical image stabilization (OIS) function in two or more axes; and
wherein the liquid lens and the mechanical actuator cooperatively operate to perform the OIS function in four or more axes with mechanical motion limited to an X-Y plane.

2. The camera module of claim 1, wherein:
the four or more axes of the OIS function comprise pitch, yaw, the first lateral axis, and the second lateral axis; and
the X-Y plane of the mechanical motion comprises the first lateral axis and the second lateral axis.

3. The camera module of claim 1, wherein
the tilt of the liquid interface is adjustable in response to a relatively small movement of the camera module; and
the mechanical actuator causes the relative translation between the lens assembly and the image sensor in response to a relatively large movement of the camera module.

4. The camera module of claim 3, wherein each of the relatively small movement and the relatively large movement is, independently, in one or more of the X-direction, the Y-direction, the first rotational direction, or the second rotational direction.

5. The camera module of claim 1, wherein both (a) the tilt of the liquid interface is adjusted and (b) the mechanical actuator causes the relative translation between the lens assembly and the image sensor to perform the OIS function.

6. The camera module of claim 1, wherein the liquid lens and the mechanical actuator cooperatively operate to perform the OIS function in five or more axes with mechanical motion in three or fewer axes.

7. The camera module of claim 6, wherein:
the five or more axes of the OIS function comprise pitch, yaw, roll, the first lateral axis, and the second lateral axis; and
the three or fewer axes of the mechanical motion comprise roll, the first lateral axis, and the second lateral axis.

8. The camera module of claim 6, wherein the mechanical actuator causes the relative translation between the lens assembly and the image sensor and a relative rotation between the lens assembly and the image sensor in a third rotational direction about the optical axis to perform the OIS function in three or more axes.

9. The camera module of claim 1, the mechanical actuator comprising:
a first actuating member that causes relative translation between the lens assembly and the image sensor in substantially only the X-direction; and
a second actuating member that causes relative translation between the lens assembly and the image sensor in substantially only the Y-direction;
whereby the first actuating member and the second actuating member cooperatively cause the relative translation between the lens assembly and the image sensor in each of the X-direction and the Y-direction.

10. The camera module of claim 9, wherein:
the first actuating member causes translation of one of the lens assembly or the image sensor without any substantial translation of the other of the lens assembly or the image sensor; and
the second actuating member causes translation of the other of the lens assembly or the image sensor without any substantial translation of the one of the lens assembly or the image sensor.

11. The camera module of claim 1, wherein the liquid interface is adjustable to perform an autofocus function.

12. The camera module of claim 11, wherein the lens assembly is fixed relative to the image sensor in a Z-direction parallel to the optical axis.

13. The camera module of claim 1, wherein a shape of the liquid interface is adjustable to adjust a focal length of the lens assembly.

14. The camera module of claim 1, comprising a control unit operatively coupled to each of the liquid lens and the mechanical actuator to control (a) the tilt of the liquid interface and (b) the relative translation between the lens assembly and the image sensor.

15. The camera module of claim 14, wherein:
the control unit adjusts the tilt of the liquid interface in response to a relatively small rotational movement of the camera module of greater than 0° and at most 3°; and
the control unit causes the relative translation between the lens assembly and the image sensor in response to a relatively large rotational movement of the camera module that is larger than the relatively small rotational movement.

16. A camera module comprising:
an image sensor;
a lens assembly positioned to focus an image on the image sensor and comprising a variable lens that is adjustable to cause lateral adjustment of a focal point of the lens assembly; and
a mechanical actuator that causes relative translation between the lens assembly and the image sensor in a lateral plane, the relative translation limited to the lateral plane;
wherein the lateral adjustment of the focal point of the lens assembly caused by the variable lens and the relative translation caused by the mechanical actuator cooperatively perform an optical image stabilization (OIS) function in four axes.

17. The camera module of claim 16, wherein the lateral adjustment of the focal point of the lens assembly caused by the variable lens and the relative translation caused by the mechanical actuator cooperatively perform the OIS function in the four axes with mechanical motion substantially limited to the lateral plane.

18. The camera module of claim 16, wherein the lens assembly is fixed relative to the image sensor in each of a pitch direction, a yaw direction, and a Z-direction perpendicular to the lateral plane.

19. The camera module of claim 16, wherein the mechanical actuator comprises a two-axis mechanical actuator.

20. The camera module of claim 19, wherein:
the mechanical actuator causes relative rotation between the lens assembly and the image sensor in a roll direction; and
the lateral adjustment of the focal point of the lens assembly caused by the variable lens, the relative translation caused by the mechanical actuator, and the relative rotation caused by the mechanical actuator cooperatively perform the OIS function in five axes with mechanical motion substantially limited to the lateral plane.

21. The camera module of claim 16, wherein:
the mechanical actuator causes relative rotation between the lens assembly and the image sensor in a roll direction; and
the lateral adjustment of the focal point of the lens assembly caused by the variable lens, the relative translation caused by the mechanical actuator, and the relative rotation caused by the mechanical actuator cooperatively perform the OIS function in five axes with mechanical motion substantially limited to the lateral plane.

22. The camera module of claim 21, wherein the five axes of the OIS function comprise pitch, yaw, roll, a first lateral axis of the lateral plane, and a second lateral axis of the lateral plane.

23. The camera module of claim 16, wherein:
the variable lens is a liquid lens comprising a liquid interface; and
a tilt of the liquid interface is adjustable to cause the lateral adjustment of the focal point of the lens assembly.

24. The camera module of claim 16, wherein
the variable lens is adjustable to cause the lateral adjustment of the focal point of the lens assembly in response to a relatively small movement of the camera module; and
the mechanical actuator causes the relative translation between the lens assembly and the image sensor in response to a relatively large movement of the camera module.

25. The camera module of claim 24, wherein:
the relatively small movement of the camera module is a rotational movement of the camera module of greater than 0° and at most 0.3°; and
the relatively large movement of the camera module is a rotational movement of the camera module that is larger than the relatively small movement.

26. The camera module of claim 25, wherein:
the relatively small movement of the camera module is a rotational movement of the camera module of greater than 0° and at most 0.1°.

27. A camera module comprising:
an image sensor;
a lens assembly positioned to focus an image of an object on the image sensor and comprising a variable lens that is adjustable to cause lateral adjustment of a focal point of the lens assembly; and
a mechanical actuator that causes relative translation between the lens assembly and the image sensor in a lateral plane, the relative translation limited to the lateral plane;
wherein the variable lens and the mechanical actuator cooperate to maintain a position of the image on the image sensor as a position of the object shifts relative to the camera module.

28. The camera module of claim 27, wherein the variable lens and the mechanical actuator cooperate to maintain the position of the image on the image sensor as the position of the object shifts relative to the camera module in one or more of a pitch direction, a yaw direction, a first lateral direction substantially perpendicular to an optical axis of the lens assembly, or a second lateral direction substantially perpendicular to each of the optical axis of the lens assembly and the first lateral direction.

29. The camera module of claim 27, wherein:
the variable lens is a liquid lens comprising a liquid interface; and
a tilt of the liquid interface is adjustable to cause the lateral adjustment of the focal point of the lens assembly.

30. The camera module of claim 27, wherein the mechanical actuator comprises a two-axis mechanical actuator.

* * * * *